(12) United States Patent
Coad et al.

(10) Patent No.: US 11,009,435 B2
(45) Date of Patent: May 18, 2021

(54) FIXTURE FOR TESTING A TEST SPECIMEN

(71) Applicant: The Boeing Company, Chicago, IL (US)

(72) Inventors: Dennis Lynn Coad, Madison, AL (US); Bruno Zamorano Senderos, Huntsville, AL (US); Garnel King, Madison, AL (US); Stefanie Anita Meier, Seattle, WA (US); Rogie I. Rodriguez, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 193 days.

(21) Appl. No.: 16/413,855

(22) Filed: May 16, 2019

(65) Prior Publication Data

US 2020/0363302 A1 Nov. 19, 2020

(51) Int. Cl.
*G01N 3/00* (2006.01)
*G01N 3/04* (2006.01)
*G01N 3/08* (2006.01)

(52) U.S. Cl.
CPC .............. *G01N 3/04* (2013.01); *G01N 3/08* (2013.01); *G01N 2203/0017* (2013.01)

(58) Field of Classification Search
CPC ..... G01N 3/04; G01N 3/08; G01N 2203/0017
USPC .......................................................... 73/831
See application file for complete search history.

(56) References Cited

U.S. PATENT DOCUMENTS

| | | | | |
|---|---|---|---|---|
| 3,757,568 A * | 9/1973 | Fletcher | ................... | G01N 3/04 73/856 |
| 4,080,824 A * | 3/1978 | Starks | ..................... | G01N 3/04 73/859 |
| 4,213,331 A * | 7/1980 | Porter | ..................... | G01B 7/34 73/105 |
| 4,916,954 A * | 4/1990 | Buzzard | ................... | G01N 3/08 73/799 |
| 5,313,841 A * | 5/1994 | Layher | ..................... | G01N 3/04 257/E21.53 |
| 5,741,976 A | 4/1998 | Schinke et al. | | |
| 6,216,531 B1 * | 4/2001 | Zhou | ....................... | G01N 3/04 73/150 A |

(Continued)

FOREIGN PATENT DOCUMENTS

CN 101949797 B 5/2012
WO 2017220567 A1 12/2017

OTHER PUBLICATIONS

Lucas, G.E., "Review of Small Specimen Test Techniques for Irradiation Testing", Metallurgical and Materials Transaction A, May 1, 1990, pp. 1105-1119, vol. 21A.
ASTM International, "Small Specimen Test Techniques: 6th Volume", Selected Technical Papers, Jan. 1, 2015, pp. 1-260, vol. 6.

(Continued)

*Primary Examiner* — Max H Noori
*Assistant Examiner* — Masoud H Noori
(74) *Attorney, Agent, or Firm* — Coats & Bennett, PLLC (57) ABSTRACT

A test fixture configured to attach to and apply a tensile force to a test specimen. The test fixture may include a first clevis section and a second clevis section that are each configured to be attached to the test specimen. Each of the first and second clevis sections may include a fixed block and a movable block. Connectors connect the clevis sections together and hold the test specimen. The first and second clevis sections may be moved apart to apply a force to the attached test specimen to test one or more properties of the test specimen.

20 Claims, 7 Drawing Sheets

(56) References Cited

U.S. PATENT DOCUMENTS

| | | | |
|---|---|---|---|
| 6,983,658 B2 | 1/2006 | Wenski | |
| 2002/0162400 A1* | 11/2002 | Xie | G01N 3/32 |
| | | | 73/812 |
| 2008/0309360 A1* | 12/2008 | Hall | G01R 31/69 |
| | | | 324/756.05 |
| 2011/0041624 A1* | 2/2011 | Barnes | G01M 13/02 |
| | | | 73/862.042 |
| 2012/0210801 A1* | 8/2012 | Pettit | G01N 3/38 |
| | | | 73/799 |
| 2014/0123773 A1* | 5/2014 | Lemmer | G01N 3/04 |
| | | | 73/863.01 |
| 2015/0338325 A1* | 11/2015 | Kismarton | G01N 3/02 |
| | | | 73/788 |
| 2020/0124510 A1* | 4/2020 | Ma | G01N 3/24 |
| 2020/0309656 A1 | 10/2020 | Achten et al. | |

OTHER PUBLICATIONS

ASTM International, "Effects of Radiation on Materials", Proceedings of the Tenth International Symposium, Jan. 1, 1981, pp. 1-765.

Jung, P., et al., "Recommendation of miniaturized techniques for mechanical testing of fusion materials in an intense neutron source", Journal of Nuclear Materials, Feb. 21, 1996, pp. 186-205, vol. 232.

ASTM International, "Standard Test Methods for Tension Testing of Metallic Materials", American Association State Highway and Transportation Officials Standard, Aug. 1, 2016, pp. 1-30.

ASTM International, "Effects of Radiation on Materials", Twelfth International Symposium, Nov. 1, 1985, pp. 1-533, vol. 1.

Sergueeva, A.V., et al., "Gage length and sample size effect on measured properties during tensile testing", Materials Science & Engineering A, 2009, pp. 79-83, vol. 526.

Kumar, K., et al., "Optimisation of thickness of miniature tensile specimens for evaluation of mechanical properties", Materials Science & Engineering A, 2016, pp. 32-43, vol. 675.

Reddy, A., et al., "Small Scale Mechanical Testing for Additively Manufactured (Direct Metal Laser Sintered) Monolithic and Hybrid Test Samples", Procedia Structural Integrity 14, 2nd International Conference on Structural Integrity and Exhibition 2018, Jan. 1, 2019, pp. 449-466, vol. 14, Elsevier B.V.

EP Search Report dated Oct. 21, 2020 in re EP Application No. 20172054.7.

* cited by examiner

FIXTURE FOR TESTING A TEST SPECIMEN

TECHNOLOGICAL FIELD

The present disclosure generally relates to a test fixture and, more particularly, to a test fixture that transfers one or more forces from a test frame to a test specimen.

BACKGROUND

A test fixture secures and aligns a test specimen during material property testing. The test fixture includes sections that are each attached to a test frame. The sections of the test fixture are also each secured to the test specimen. During testing, the test frame applies a force that separates the sections of the test fixture. This force is transferred from the test fixture to the test specimen. The results of the testing are used to determine one or more properties of the material and whether the material is adequate for its intended purpose.

The test specimens can be small samples of the material. The test specimen basically includes an elongated shape and can include various dimensions and sizes. The test fixture should securely attach to opposing portions of the test specimen. This prevents the test specimen from moving when the tensile force is transferred from the test fixture which could compromise the test results. This also provides for the force applied by the test frame to be accurately transferred to the test specimen and thus provide for accurate testing results. The test fixture should also attach to the test specimen to prevent the test specimen from tearing, curling, or buckling during the test.

SUMMARY

One aspect is directed to a test fixture for testing a test specimen. The test fixture includes a first clevis section and a second clevis section each configured to connect to and extend along opposing sides of the test specimen. Each of the first clevis section and the second clevis section include: a fixed block with a receptacle; a movable block sized to be positioned at the receptacle and with a base and an arm with the base having a thickness that is greater than the arm to form a gap between the fixed block and the arm when the movable block is connected to the fixed block at the receptacle; a first connector that connects the base to the fixed block; and a second connector that extends through the gap and connects the arm to the fixed block. The gap is sized to receive the test specimen with the fixed block positioned along a first side of the gap and the movable block positioned along an opposing second side of the gap.

In another aspect, adapters are connected to the fixed blocks of the first clevis section and the second clevis section with the adapters positioned at outer ends of the fixed blocks and away from the receptacles that are positioned at inner ends of the fixed blocks.

In another aspect, the adapters, the first connectors, and the second connectors are positioned along a straight line that extends through the first and second clevis sections.

In another aspect, the first connectors extend through the movable block and are spaced away from the gaps and the second connectors are exposed within the gaps.

In another aspect, openings are in the movable blocks and openings are in the fixed blocks with the second connectors positioned in each of the openings when the movable blocks are attached to the fixed blocks.

In another aspect, the first connectors include shafts sized to extend through the openings in the movable blocks and heads that are larger than the openings to prevent insertion of the heads into the openings.

In another aspect, the fixed blocks and the movable blocks of the first clevis section and the second clevis section comprise the same shape and size.

In another aspect, the first connectors are fixedly connected to the fixed blocks and the second connectors are removably connected to the fixed blocks with the first connectors configured to remain connected to the fixed blocks and the second connectors configured to be disconnected from the fixed blocks when the movable blocks are removed from the fixed blocks.

Another aspect is directed to a test fixture for testing a test specimen. The test fixture includes first and second fixed blocks each with an outer end, an inner end, and a receptacle at the inner end. The test fixture includes first and second movable blocks with the first movable block sized to be connected to the first fixed block and the second movable block sized to be connected to the second fixed block. First and second connectors are configured to attach the first movable block to the first fixed block and the second movable block to the second fixed block, respectively. A first gap is formed between the first fixed block and the first movable block at the inner end of the first fixed block. The first gap is sized to receive a first end of the test specimen and to sized prevent contact between the test specimen and either of the first fixed block and the first movable block. A second gap is formed between the second fixed block and the second movable block at the inner end of the second fixed block. The second gap is sized to receive a second end of the test specimen and sized to prevent contact between the test specimen and either of the second fixed block and the second movable block.

In another aspect, the receptacles of the first and second fixed blocks extend through a centerline of the first and second fixed blocks.

In another aspect, the first fixed block and the first movable block form a first clevis section that extends along opposing sides of the test specimen and the second fixed block and the second movable block form a second clevis section that extends along the opposing sides of the test specimen.

In another aspect, a centerline of the first gap is aligned with a centerline of the first fixed block and a centerline of the second gap is aligned with a centerline of the second fixed block.

In another aspect, the test specimen is an additive manufactured material for use with a vehicle.

In another aspect, the first and second movable blocks include bases and arms with the bases having a greater thickness than the arms for the arms to be spaced away from the first and second fixed blocks to form the first and second gaps.

Another aspect is directed to a method of testing a test specimen with a test fixture. The method includes positioning a first section of a test specimen at a first clevis section. The method includes inserting a first connector that extends from a first fixed block of the first clevis section into a first opening in the first section of the test specimen. The method includes attaching a first movable block to the first fixed block and positioning the first section of the test specimen in a first gap formed between the first fixed block and the first movable block. The method includes positioning a second section of the test specimen at a second clevis section. The method includes inserting a second connector that extends from a second fixed block of the second clevis section into a second opening in the second section of the test specimen.

The method includes attaching a second movable block to the second fixed block and positioning the second section of the test specimen in a second gap formed between the second fixed block and the second movable block. The method includes separating the first clevis section and the second clevis section and applying a tensile force to the test specimen while the first section of the test specimen is attached to the first connector and spaced away from the first fixed block and the first movable block and while the second section of the test specimen is attached to the second connector and spaced away from the second fixed block and the second movable block.

In another aspect, the method includes inserting the first connector through openings in the first movable block and the first fixed block and through the first opening in the first section of the test specimen.

In another aspect, the method includes attaching the first movable block to the first fixed block at a first connection point and attaching the second movable block to the second fixed block at a second connection point, with the first and second connection points and the first and second openings being aligned along a straight line.

In another aspect, the method includes preventing either of the first movable block and the second movable block from applying pressure to the test specimen.

In another aspect, the method includes inserting a shaft of a third connector through the first movable block and into the first fixed block and attaching the first movable block to the first fixed block and with the shaft being positioned away from the test specimen.

In another aspect, the method includes sliding the first movable block over a third connector that extends outward from the first fixed block and attaching the first movable block to the first fixed block and with the connector being positioned away from the test specimen.

DETAILED DESCRIPTION

Figure 1:
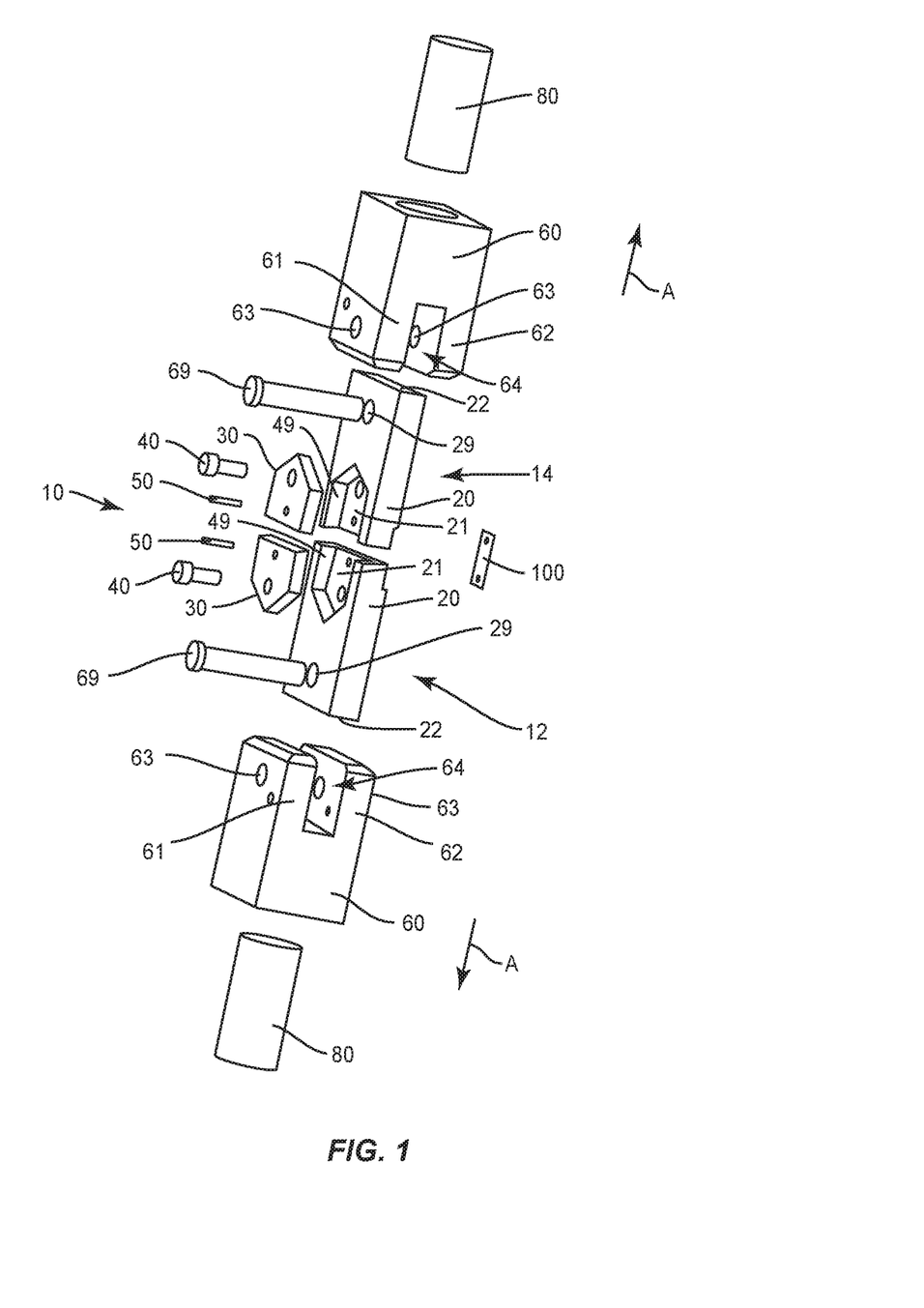
FIG. 1 is an exploded perspective view of a test fixture with first and second clevis sections positioned between adapters and a test frame.

FIG. 1 includes a test fixture 10 configured to attach to and transfer a tensile force to a test specimen 100. The test fixture 10 includes a first clevis section 12 and a second clevis section 14 that are each configured to attach to the test specimen 100. Each of the first and second clevis sections 12, 14 includes a fixed block 20 and a movable block 30. First connectors 40 connect the movable blocks 30 to the fixed blocks 20. Second connectors 50 hold the test specimen 100 to the first and second clevis sections 12, 14.

The test fixture 10 can be attached to a test frame 80. The attachment can be direct, or can be through one or more adapters 60. The test frame 80 is configured to apply an outward force to the test fixture 10 as illustrated by arrows A. The attached first and second clevis sections 12, 14 are configured to be moved away from each and thus transfer the force to the attached test specimen 100. This tensile force provides for testing one or more properties of the test specimen 100.

Figures 2, 2A:
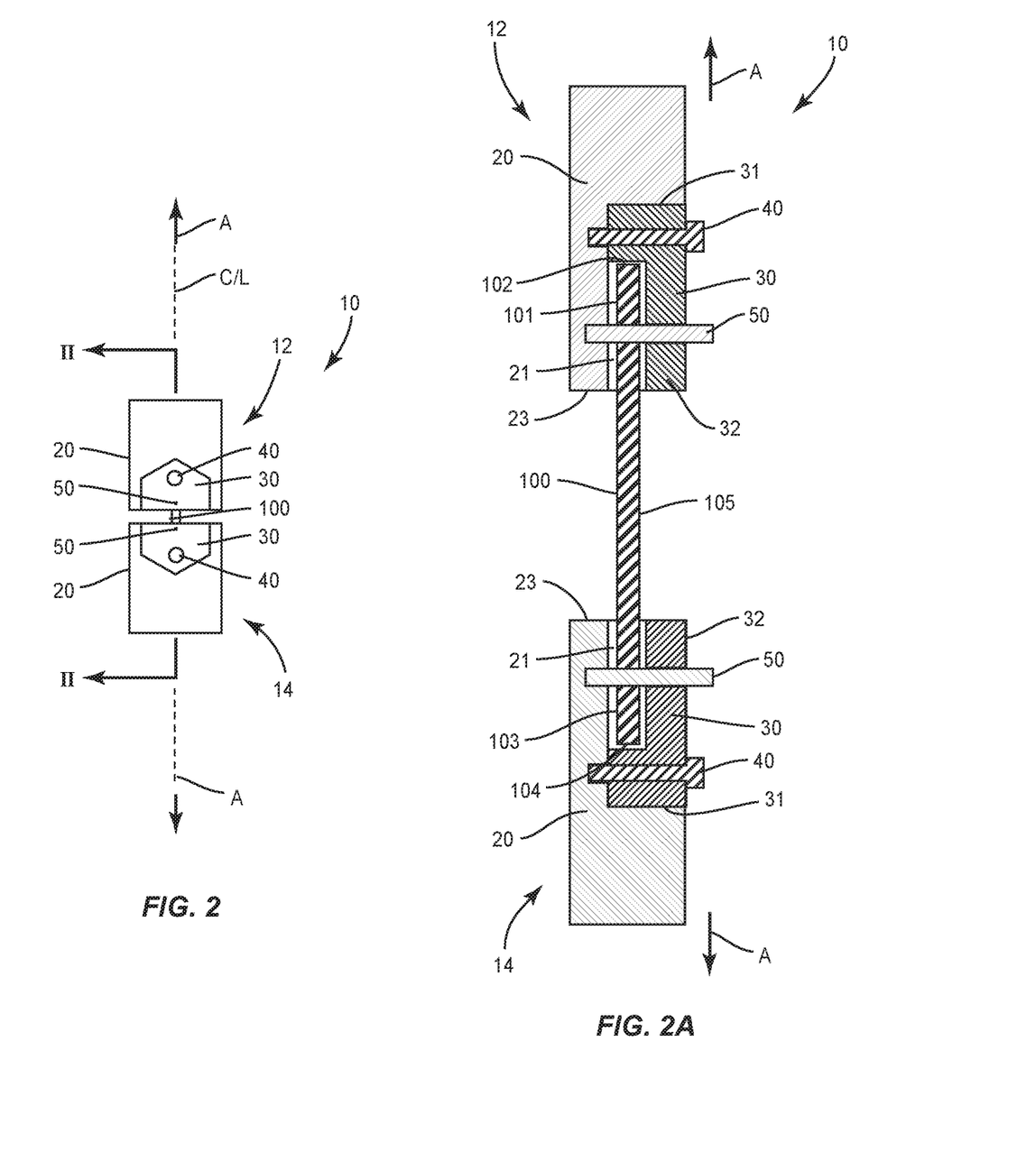
FIG. 2 is a front view of a test fixture with a mounted test specimen.
FIG. 2A is a section view of the test fixture of FIG. 2 cut along line II-II.

As illustrated in FIGS. 2 and 2A, the first clevis section 12 is connected to a first portion 101 of the test specimen 100 in proximity to a first end 102. The first clevis section 12 extends along opposing sides of the first portion 101. The second clevis section 14 is connected to a second portion 103 of the test specimen 100 in proximity to a second end 104. The second clevis section 14 extends along opposing sides of the second portion 103. A central portion 105 of the test specimen 100 extends between the first and second portions 101, 103. The central portion 105 can be exposed between the first and second clevis sections 12, 14.

The first clevis section 12 and the second clevis section 14 can be mirror images with the fixed blocks 20 and movable blocks 30 having the same shapes and sizes. Other designs can include differences between one or both of the fixed blocks 20 and the movable blocks 30.

Figure 3A:
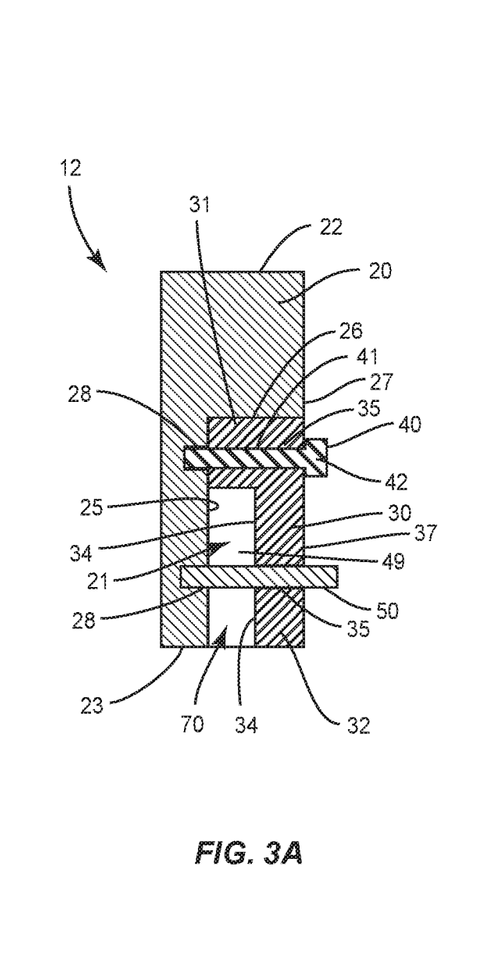
FIG. 3A is a section view of a first clevis section of a test fixture.
Figure 3B:
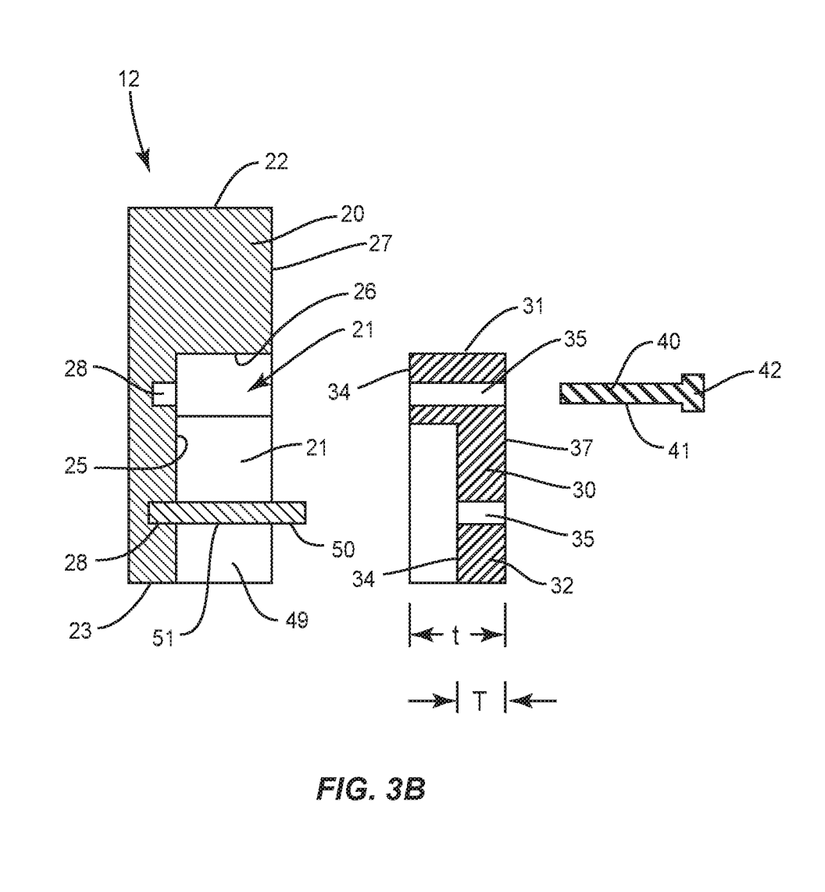
FIG. 3B is an exploded section view of the first clevis section of FIG. 3A.

FIG. 3A illustrates the clevis section 12 in an assembled configuration with the first connector 40 connecting the movable block 30 to the fixed block 20. FIG. 3B illustrates the clevis section 12 in a disassembled configuration. In both configurations, the second connector 50 remains attached to the fixed block 20. The second clevis section 14 (not illustrated in FIG. 3A or 3B) can include the same elements with the same shapes and sizes.

The fixed block 20 includes an outer end 22 and an inner end 23. As illustrated in FIG. 2A, the inner ends 23 face one another during use. A receptacle 21 is positioned at and extends inward from the inner end 23. As illustrated in FIGS. 3A and 3B, the receptacle 21 includes a back wall 25, an end wall 26, and side walls 49. The receptacle 21 can include the same shape and size as the movable block 30. This provides for the movable block 30 to seat within the receptacle 21. The receptacle 21 and movable block 30 can be shaped to prevent rotation of the movable block 30 relative to the fixed block 20. FIG. 1 illustrates each having a peaked shape that prevents rotation. Various other shapes can also be used to prevent rotation of the movable block 30 relative to the fixed block 20.

The receptacle 21 can extend into the front face 27 at various depths. In one design, the depth of the receptacle 21 is equal to the thickness t of the movable block 30. As illustrated in FIG. 3A, this provides for the movable block 30 to seat within the receptacle 21 and for the front face 37 of the movable block 30 to be flush with the front face 27 of the fixed block 20.

One or more openings 28 extend into the back wall 25 of the receptacle 21. The openings 28 are each configured to receive one of the first and second connectors 40, 50. The openings 28 can extend a limited distance into the back wall 25, or one or more can extend completely through the entirety of the back wall 25.

The movable blocks 30 are configured to be connected to the fixed blocks 20. The movable blocks 30 include a base 31 and an arm 32. The movable blocks 30 also include a front face 37 and an opposing inner face 34. As illustrated in FIG. 3B, the thickness t of the base 31 measured between the front face 37 and inner face 34 is greater than the thickness T of the arm 32. This difference in thickness provides for the front face 37 of the arm 32 to be spaced away from the back wall 25 of the fixed block 20 when the movable block 30 is connected to the fixed block 20. This forms a gap 70 between the back wall 25 and the inner face 34 of the arm 32 to receive the test specimen 100. In the assembled configuration, the inner face 34 of the base 31 can be in contact with or spaced away from the back wall 25.

One or more openings 35 extend through the movable block 30. The openings 35 are sized to receive one of the first and second connectors 40, 50. As illustrated in FIGS. 3A and 3B, a first opening 35 extends through the base 31 to receive the first connector 40 to connect the movable block 30 to the fixed block 20. As illustrated in FIG. 3A, the first opening 35 and the first connector 40 are spaced away from the gap 70. The first opening 35 can also align with an opening 28 in the back wall 25 of the fixed block 20. The openings 35, 28 align to receive the first connector 40. A second opening 35 extends through the arm 32 to receive the second connector 50 that connects to the test specimen 100. The second opening 35 can align with an opening 28 in the back wall 25 to receive the second connector 50.

The first connector 40 is configured to connect the movable block 30 to the fixed block 20. The first connector 40 can include a shaft 41 and a head 42. The shaft 41 is sized to extend into the opening 35 in the movable block 30 and opening 28 in the fixed block 20. The shaft 41 can be straight to facilitate insertion into the openings 35, 28. The head 42 includes a larger sectional size than the opening 35. This prevents the head 42 from being inserted into the opening 35. The larger size of the head 42 can also prevent the movable block 30 from sliding off of the first connector 40. In one design, the first connector 40 is removably connected to the fixed block 20. The removable connection can be achieved in various manners including one or more of a friction fit within the opening 28, and a threaded connection between the shaft 41 and opening 28.

The second connector 50 includes a shaft 51. The shaft 51 can be straight to facilitate insertion into the openings 35, 28. In one design, the second connector 50 is fixedly connected to the fixed block 20. The connection can include one or more adhesives, friction fit, and mechanical attachment.

As illustrated in FIG. 1, adapters 60 can be connected to the fixed blocks 20. The adapters 60 include a pair of arms 61, 62 that are spaced apart by a gap 64. The gap 64 is sized to receive the outer end 22 of the fixed block 20. Openings 63 in the arms 61, 62 align with openings 29 in the fixed blocks 20. Connectors 69 extend through the openings 63 to pivotally connect the adapters 60 to the fixed blocks 20. The adapters 60 are configured to be connected to a test frame 80. The test frame 80 applies an outward force that provides a tensile force on the test specimen 100 while being held by the test fixture 10. In another design (not illustrated), the test frame 80 attaches directly to the test fixture 10.

Figure 4:
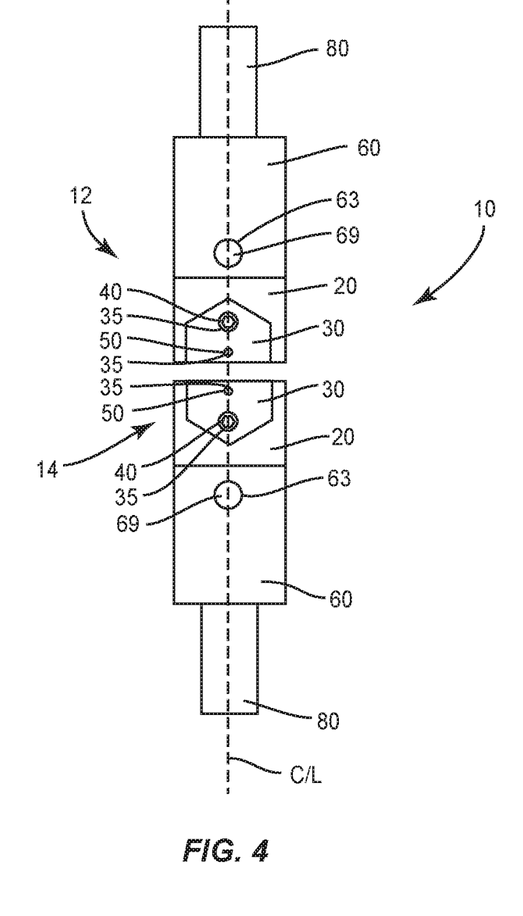
FIG. 4 is a front view of first and second clevis sections mounted to adapters and a test frame.

As illustrated in FIG. 4, a centerline (C/L) extends through the openings 63, 35 and corresponding connectors 69, 40, 50. The centerline (C/L) can also extend through a center of the test frame 80.

Figure 5:
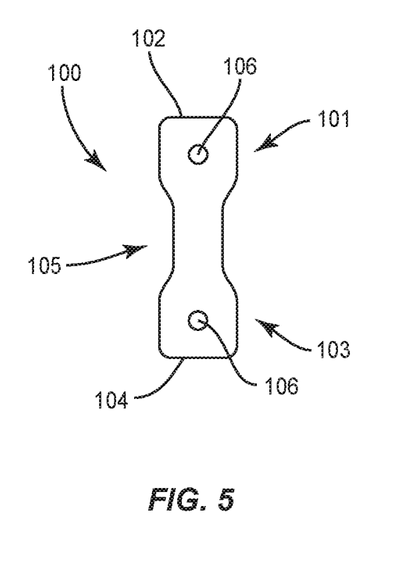
FIG. 5 is a front view of a first tensile test specimen.

The test specimens 100 are configured to be held by the test fixture 10. FIG. 5 illustrates a test specimen 100 that includes an elongated shape with a first end 102 and a second end 104. A central portion 105 is located between outer first and second portions 101, 103. The central portion 105 is narrower than the first and second portions 101, 103. Openings 106 are positioned towards each of the first and second ends 102, 104. The openings 106 are configured to receive the second connectors 50 on the test fixture 10.

The test fixture 10 can be used for testing a variety of different test specimens 100. The test specimens 100 can include witness samples or standard size coupons that are fabricated in the same lot as or extracted from plate materials, extrusions, and forgings. The test specimens 100 can include standard size coupons, such as those used during testing of materials (e.g., plate materials, extrusions, forgings) with well-known properties. The test specimens 100 can also be formed from additively manufactured (AM) components. The test specimens 100 can be extracted from AM test coupons or AM parts.

The test specimens 100 can be constructed from a variety of different materials. Materials include but are not limited to non-metallic materials, metallic materials such as but not limited to titanium, aluminum, nickel, and various product forms such as sheet, plate, forged blocks, and castings.

Figure 6:
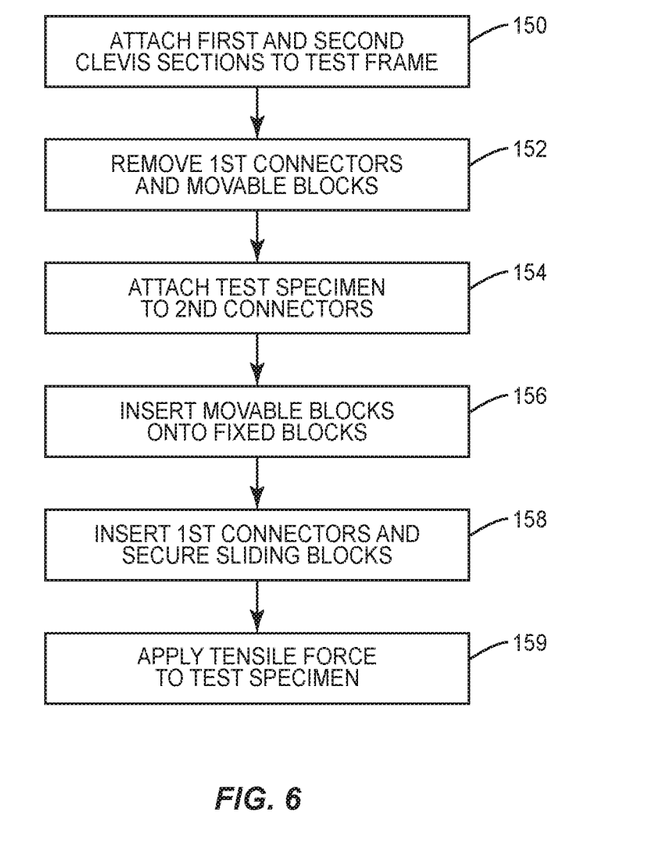
FIG. 6 is a flowchart diagram of a method of using a test fixture to test a test specimen.

FIG. 6 illustrates a method of using a test fixture 10 and testing a test specimen 100. The test fixture 10 is attached to the test frame 80. This can include attaching the first clevis section 12 to a first part of the test frame 80 and the second clevis section 14 to a second part of the test frame 80 (block 150). The first and second clevis sections 12, 14 can be connected directly to the test frame 80, or can be attached through adapters 75.

The first connectors 40 and movable blocks 30 are removed from the clevis section 12, 14 (block 152). As illustrated in FIG. 3B, the second connectors 50 remain connected to the fixed block 20. The second connector 50 extends outward from the fixed block 20 with the outer end being exposed.

The test specimen 100 is attached to the each of the second connectors 50 (block 154). This includes inserting the second connector 50 on the first clevis section 12 through the opening 106 at the first portion 101 of the test specimen 100, and inserting the second connector 50 on the second clevis section 14 through the opening 106 at the second portion 103 of the test specimen 100.

Once the test specimen 100 is positioned on the second connectors 50, the movable blocks 30 are inserted back onto the fixed blocks (block 156). This includes positioning the movable blocks 30 in the receptacles 21 of the fixed blocks 20. This also includes sliding the openings 35 on the arms 32 over the second connectors 50 that extend outward from the fixed blocks 20.

The first connectors 40 are then inserted through the openings 35 and the movable blocks 30 are connected to the fixed blocks (block 158).

FIGS. 2 and 2A illustrates the test specimen 100 being held by the test fixture 10. The test specimen 100 is located on the second connectors 50 and do not contact against either of the fixed blocks 20 or the movable blocks 30. The close positioning between the movable blocks 30 and the fixed blocks 20 can also prevent the test specimen 100 from buckling during the testing.

Once the test specimen 100 has been secured, the test frame 80 is moved outward. This causes the first and second clevis sections 12, 14 to separate and transfer a tensile force to the test specimen (block 159). The variables of the testing can vary, including but not limited to the amount of force applied to the test specimen 100 and the length of time the force is applied.

In one method, the test specimen 100 can be attached to the test fixture 10 in various orders. In one method, the movable blocks 30 are removed from each corresponding fixed block 20. Once removed, the test specimen 100 is attached to each corresponding second connector 50. The movable blocks 30 are then reconnected to the fixed blocks 20. Another method includes one of the movable blocks 30 being removed from the corresponding fixed block 20. The test specimen 100 is attached to the second connector 50 and the movable block 30 is reconnected. Once completed, the other movable block 30 is removed, the test specimen 100 attached to that second connector 50, and then the movable block 30 is reconnected.

Figure 7:
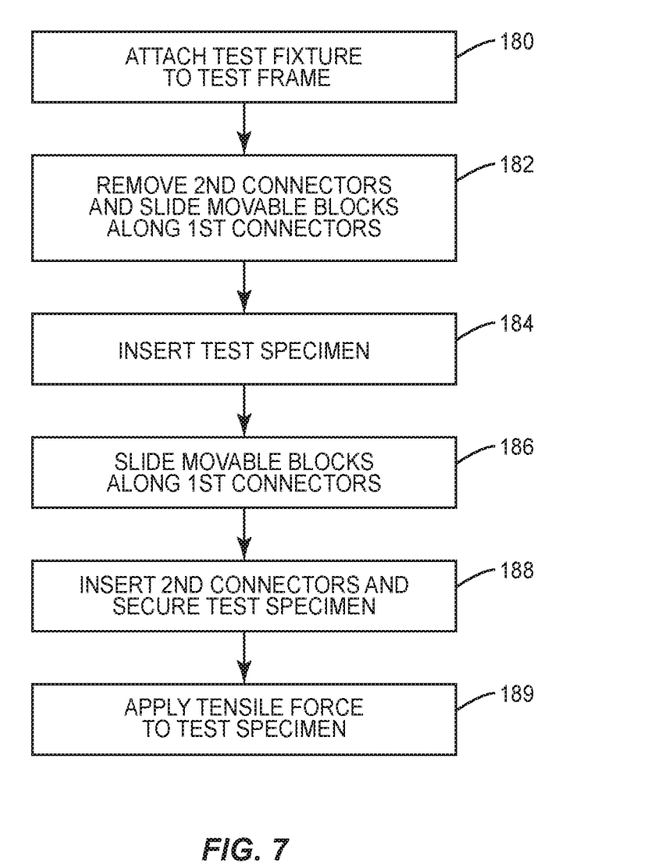
FIG. 7 is a flowchart diagram of a method of using a test fixture to test a test specimen.
Figure 8:
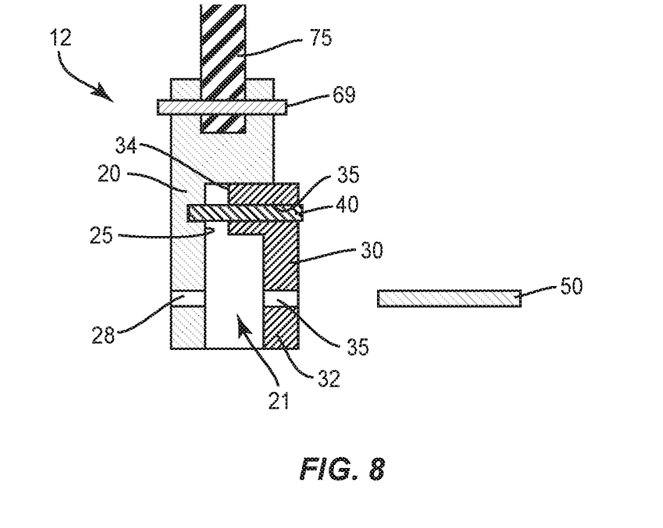
FIG. 8 is an exploded section view of a first clevis section.
Figure 9:
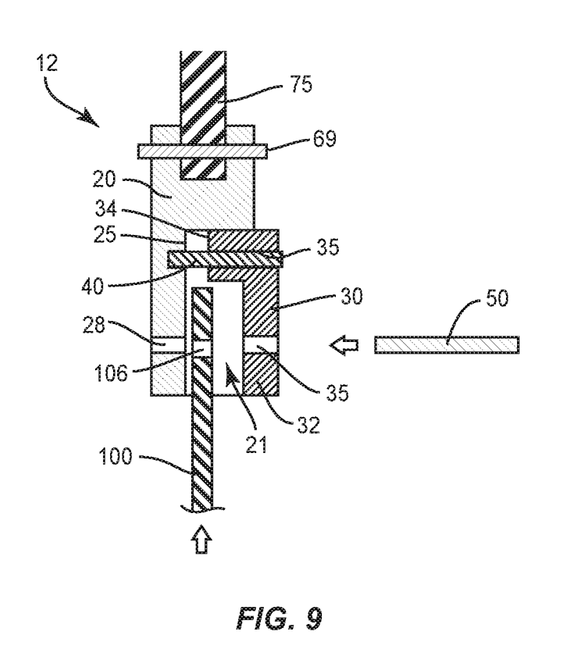
FIG. 9 is an exploded section view of the first clevis section of FIG. 9 with a test specimen positioned at a fixed block.
Figure 10:
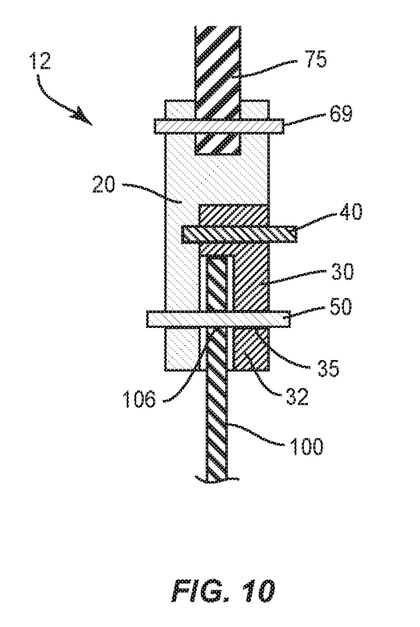
FIG. 10 is a section view of a test specimen mounted to a first clevis section.

FIG. 7 includes a method of testing a test specimen 100 with a test fixture 10 that includes a slip-fit configuration. FIGS. 8-10 illustrate different aspects of the method.

The method includes attaching the test fixture 10 to the test frame 80 (block 180). This can include directly attaching the first and second clevis sections 12, 14 to the test frame 80. This can also include attaching the first and second clevis sections 12, 14 to the test frame 80 through adapters 75.

The second connectors 50 are removed from the fixed blocks 20 (block 182). The first connectors 40 remain connected to the fixed blocks 20. The shape of the first connectors 40 and corresponding openings 35 provide for the movable blocks 30 to slide along the first connectors 40 and away from the fixed blocks 20 (block 182). As illustrated in FIG. 8, the movable blocks 30 remain on the first connectors 40.

The test specimen 100 is then inserted into the receptacle 21 at the fixed blocks 20 (step 184). As illustrated in FIG. 9, the test specimen 100 is positioned with the openings 106 of the test specimen 100 aligned with the openings 28 in the fixed blocks 20. During the insertion and alignment of the test specimen 100, the movable blocks 30 remain on the first connectors 40.

The movable blocks 30 are then slid along the first connectors 40 towards the fixed blocks 20 (step 186). The movable blocks 30 can be slide along the first connectors 40 until the inner faces 34 contact against the back walls 25. The movable blocks 30 can also be inserted a lesser amount with the inner faces 34 spaced from the back walls 25. This positioning also aligns the openings 35 in the arms 32 of the movable blocks 30 with the openings 28 of the fixed blocks 20 and the openings 106 of the test specimens 100.

The second connectors 50 are then inserted through the test specimen 100 (block 188). As illustrated in FIG. 10, the second connectors 50 are inserted through the openings 35 in the movable blocks 30 and through the openings 106 in the test specimen 100. In one design as illustrated in FIG. 10, the openings 28 extend through the fixed blocks 20 such that the second connectors 50 can extend entirely through the fixed blocks 20. Other designs include the openings 28 extending just partially through the fixed blocks 20 and thus the second connectors 50 do not extend entirely through the fixed blocks 20 when it secures the test specimen 100.

As illustrated, the test specimen 100 is mounted on the second connectors 50 and spaced away from the fixed blocks 20 and the movable blocks 30. While in this position, a tensile force is applied to the test specimen (block 189). This includes moving apart the first and second clevis sections 12, 14 through the test frame 80.

In the method described above, the movable blocks 30 are slid towards the fixed blocks 20 prior to attachment of the second connectors 50. In another method the second connectors 50 are inserted through the movable blocks 30, test specimen 100, and into the fixed blocks 20. Then, the movable blocks 30 are slid along the first and second connectors 40, 50 towards the fixed blocks 20.

FIGS. 8-10 illustrate the first clevis section 12. The second clevis section 14 is configured and functions in a similar manner.

In one design, the test fixture 10 is used to test materials that will be used in the construction of vehicles. Vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A test fixture for testing a test specimen, the test fixture comprising:
    a first clevis section and a second clevis section each configured to connect to and extend along opposing sides of the test specimen, each of the first clevis section and the second clevis section comprising:
    a fixed block with a receptacle;
    a movable block sized to be positioned at the receptacle and comprising a base and an arm, the base having a thickness that is greater than a thickness of the arm to form a gap between the fixed block and the arm when the movable block is connected to the fixed block at the receptacle;
    a first connector that connects the base to the fixed block;
    a second connector that extends through the gap and connects the arm to the fixed block; and
    the gap sized to receive the test specimen with the fixed block positioned along a first side of the gap and the movable block positioned along an opposing second side of the gap.

2. The test fixture of claim 1, further comprising adapters connected to the fixed blocks of the first clevis section and the second clevis section, the adapters positioned at outer ends of the fixed blocks and away from the receptacles that are positioned at inner ends of the fixed blocks.

3. The test fixture of claim 2, wherein the adapters, the first connectors, and the second connectors are positioned along a straight line that extends through the first and second clevis sections.

4. The test fixture of claim 1, wherein the first connectors extend through the movable block and are spaced away from the gaps and the second connectors are exposed within the gaps.

5. The test fixture of claim 1, further comprising openings in the movable blocks and openings in the fixed blocks with the second connectors positioned in each of the openings when the movable blocks are attached to the fixed blocks.

6. The test fixture of claim 5, wherein the first connectors comprise shafts sized to extend through the openings in the movable blocks and heads that are larger than the openings to prevent insertion of the heads into the openings.

7. The test fixture of claim 1, wherein the fixed blocks and the movable blocks of the first clevis section and the second clevis section comprise a same shape and size.

8. The test fixture of claim 1, wherein the first connectors are fixedly connected to the fixed blocks and the second connectors are removably connected to the fixed blocks, with the first connectors configured to remain connected to the fixed blocks and the second connectors configured to be disconnected from the fixed blocks when the movable blocks are removed from the fixed blocks.

9. A test fixture for testing a test specimen, the test fixture comprising:
   first and second fixed blocks each comprising an outer end, an inner end and a receptacle at the inner end;
   first and second movable blocks with the first movable block sized to be connected to the first fixed block and the second movable block sized to be connected to the second fixed block;
   first and second connectors configured to attach the first movable block to the first fixed block and the second movable block to the second fixed block, respectively;
   a first gap formed between the first fixed block and the first movable block at the inner end of the first fixed block, the first gap sized to receive a first end of the test specimen and sized to prevent contact between the test specimen and either of the first fixed block and the first movable block; and
   a second gap formed between the second fixed block and the second movable block at the inner end of the second fixed block, the second gap sized to receive a second end of the test specimen and sized to prevent contact between the test specimen and either of the second fixed block and the second movable block.

10. The test fixture of claim 9, wherein the receptacles of the first and second fixed blocks extend through a centerline of the first and second fixed blocks.

11. The test fixture of claim 9, wherein the first fixed block and the first movable block form a first clevis section that extends along opposing sides of the test specimen and the second fixed block and the second movable block form a second clevis section that extends along opposing sides of the test specimen.

12. The test fixture of claim 9, wherein a centerline of the first gap is aligned with a centerline of the first fixed block and a centerline of the second gap is aligned with a centerline of the second fixed block.

13. The test fixture of claim 9, wherein the test specimen is an additive manufactured material for use with a vehicle.

14. The test fixture of claim 9, wherein the first and second movable blocks comprise bases and arms, the bases having a greater thickness than the arms for the arms to be spaced away from the first and second fixed blocks to form the first and second gaps.

15. A method of testing a test specimen with a test fixture, the method comprising:
   positioning a first section of the test specimen at a first clevis section;
   inserting a first connector that extends from a first fixed block of the first clevis section into a first opening in the first section of the test specimen;
   attaching a first movable block to the first fixed block and positioning the first section of the test specimen in a first gap formed between the first fixed block and the first movable block;
   positioning a second section of the test specimen at a second clevis section;
   inserting a second connector that extends from a second fixed block of the second clevis section into a second opening in the second section of the test specimen;
   attaching a second movable block to the second fixed block and positioning the second section of the test specimen in a second gap formed between the second fixed block and the second movable block; and
   separating the first clevis section and the second clevis section and applying a tensile force to the test specimen while the first section of the test specimen is attached to the first connector and spaced away from the first fixed block and the first movable block and while the second section of the test specimen is attached to the second connector and spaced away from the second fixed block and the second movable block.

16. The method of claim 15, further comprising inserting the first connector through openings in the first movable block and the first fixed block and through the first opening in the first section of the test specimen.

17. The method of claim 15, further comprising attaching the first movable block to the first fixed block at a first connection point and attaching the second movable block to the second fixed block at a second connection point, with the first and second connection points and the first and second openings being aligned along a straight line.

18. The method of claim 15, further comprising preventing either of the first movable block and the second movable block from applying pressure to the test specimen.

19. The method of claim 15, further comprising inserting a shaft of a third connector through the first movable block and into the first fixed block and attaching the first movable block to the first fixed block with the shaft being positioned away from the test specimen.

20. The method of claim 15, further comprising sliding the first movable block over a third connector that extends outward from the first fixed block and attaching the first movable block to the first fixed block and with the connector being positioned away from the test specimen.

* * * * *